United States Patent
Accapadi et al.

(10) Patent No.: US 7,831,980 B2
(45) Date of Patent: Nov. 9, 2010

(54) SCHEDULING THREADS IN A MULTI-PROCESSOR COMPUTER

(75) Inventors: Jos M. Accapadi, Austin, TX (US); Herman D. Dierks, Jr., Round Rock, TX (US); Andrew Dunshea, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/055,179

(22) Filed: Mar. 25, 2008

(65) Prior Publication Data

US 2008/0178183 A1    Jul. 24, 2008

Related U.S. Application Data

(63) Continuation of application No. 10/834,498, filed on Apr. 29, 2004.

(51) Int. Cl.
*G06F 9/46* (2006.01)
*G06F 13/24* (2006.01)

(52) U.S. Cl. .................. 718/108; 718/102; 710/260
(58) Field of Classification Search ............. 718/100, 718/102, 108; 710/260
See application file for complete search history.

(56) References Cited

U.S. PATENT DOCUMENTS

| 5,907,702 | A | | 5/1999 | Flynn et al. |
| 6,105,051 | A | * | 8/2000 | Borkenhagen et al. ...... 718/103 |
| 6,212,544 | B1 | * | 4/2001 | Borkenhagen et al. ...... 718/103 |
| 6,338,078 | B1 | | 1/2002 | Chang et al. |
| 6,542,921 | B1 | * | 4/2003 | Sager ........................ 718/108 |
| 6,697,935 | B1 | * | 2/2004 | Borkenhagen et al. ...... 712/228 |
| 6,754,690 | B2 | * | 6/2004 | Larson ....................... 718/102 |
| 7,234,143 | B2 | * | 6/2007 | Venkatasubramanian .... 718/102 |

* cited by examiner

*Primary Examiner*—Meng-Ai An
*Assistant Examiner*—Jennifer N To
(74) *Attorney, Agent, or Firm*—D'Ambrosio & Menon, LLP; Jo Katherine D'Ambrosio; Usha Menon (57) ABSTRACT

Scheduling threads in a multi-processor computer system including establishing an interrupt threshold for a thread, where the interrupt threshold represents a maximum permissible number of interrupts during thread execution on a processor; executing the thread on a current processor, where the thread has thread affinity for one or more processors including the current processor; counting a number of interrupts during execution of the thread on the current processor; and removing thread affinity for the current processor in dependence upon the counted number of interrupts and the interrupt threshold.

24 Claims, 5 Drawing Sheets

SCHEDULING THREADS IN A MULTI-PROCESSOR COMPUTER

CROSS-REFERENCE TO RELATED APPLICATION

This application is a continuation application of and claims priority from U.S. patent application Ser. No. 10/834,498, filed on Apr. 29, 2004.

BACKGROUND OF THE INVENTION

1. Field of the Invention

The field of the invention is data processing, or, more specifically, methods, systems, and products for scheduling threads in a multi-processor computer.

2. Description of Related Art

A thread is a unit of software execution on a multi-processing computer. On such a computer, software programs are executed in units of execution called 'processes' that include all the processor registers, code segment and offset registers, data segment and offset registers, stack segment and offset registers, flag registers, instruction pointer registers, program counters, and so on, needed for execution of software programs. For efficiency, 'processes' are often organized further as threads, where each thread of a process individually possesses all the attributes needed for execution except that a thread shares memory among all the threads of a process, thereby reducing the overhead of operating system switches from thread to thread ('context switches').

Each thread in a multi-processor computer typically is dispatched to run on a processor for a time slice, a predetermined maximum period of time for which the thread may retain possession of the processor. A thread may leave the processor by issuing a system call, for example, to send or receive data to or from input/output functions, at which time the thread is dispatched to a wait queue to wait for a return interrupt representing a response from input/output functions. While a thread is running on a processor, the thread may be interrupted by interrupts representing input/output responses from other threads, threads that are waiting on the wait queue for input/output. The interrupted thread never knows that it has been interrupted. If it is interrupted often, however, there is an effect on its overall performance despite the fact that the thread itself is never aware of its interruptions.

Consider a thread with a time slice of 10 milliseconds that is interrupted 10 times during a single time slice of operation on a processor. Assume that each interrupt requires 5 milliseconds to process. In this example, the thread requires 60 milliseconds of objective time to conduct 10 milliseconds of actual processing. For a processor-bound thread, that is, for a thread that tends to need its entire time slice on the processor, this fact pattern is very inefficient for its overall efficiency of operation.

Prior art solutions included binding interrupt processing exclusively to a single processor or to a subset of the processors on a system and refraining from assigning threads to processors reserved for interrupt processing. Such an approach is relatively static, however, leaving interrupt processing on a subset of processors and thread processing on a subset of processors even when other processors would otherwise be available to spread occasional large loads of thread processing or interrupt processing. Other prior art methods of administering varying load conditions among processors are based on load factors such as queue occupancy and measures of throughput, with little or no attention to dynamic management on the basis of interrupt frequency or interrupt count.

There is an ongoing need therefore for improvement in scheduling threads in a multi-processor computer system.

SUMMARY OF THE INVENTION

Methods, systems, and computer program products are disclosed for scheduling threads in a multi-processor computer system that include establishing an interrupt threshold for a thread, where the interrupt threshold represents a maximum permissible number of interrupts during thread execution on a processor; executing the thread on a current processor, where the thread has thread affinity for one or more processors including the current processor; counting a number of interrupts during execution of the thread on the current processor; and removing thread affinity for the current processor in dependence upon the counted number of interrupts and the interrupt threshold.

In typical embodiments, establishing an interrupt threshold includes storing a value of an interrupt threshold in memory associated with the thread. In typical embodiments, counting a number of interrupts includes incrementing by an interrupt handler a value stored in memory associated with the thread. In typical embodiments, removing thread affinity for the current processor includes removing thread affinity by a dispatcher when the thread is preempted from execution on the current processor. In some embodiments, removing thread affinity for the current processor includes placing the thread in a run queue of another processor. In some embodiments, the thread affinity includes only the current processor, and the embodiment includes setting thread affinity to include at least one other processor.

Embodiments typically also include establishing a maximum count duration for the thread; measuring elapsed count time for the thread during execution of the thread on the current processor; resetting the counted number of interrupts to zero in dependence upon the measured elapsed count time and the maximum count duration; and resetting the measured elapsed count time to zero in dependence upon the measured elapsed count time and the maximum count duration. In many embodiments, removing thread affinity for the current processor in dependence upon the counted number of interrupts and the interrupt threshold includes resetting the counted number of interrupts to zero and resetting the measured elapsed count time to zero.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for scheduling threads in a multi-processor computer. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Scheduling Threads in a Multi-Processor Computer System

Figure 1:
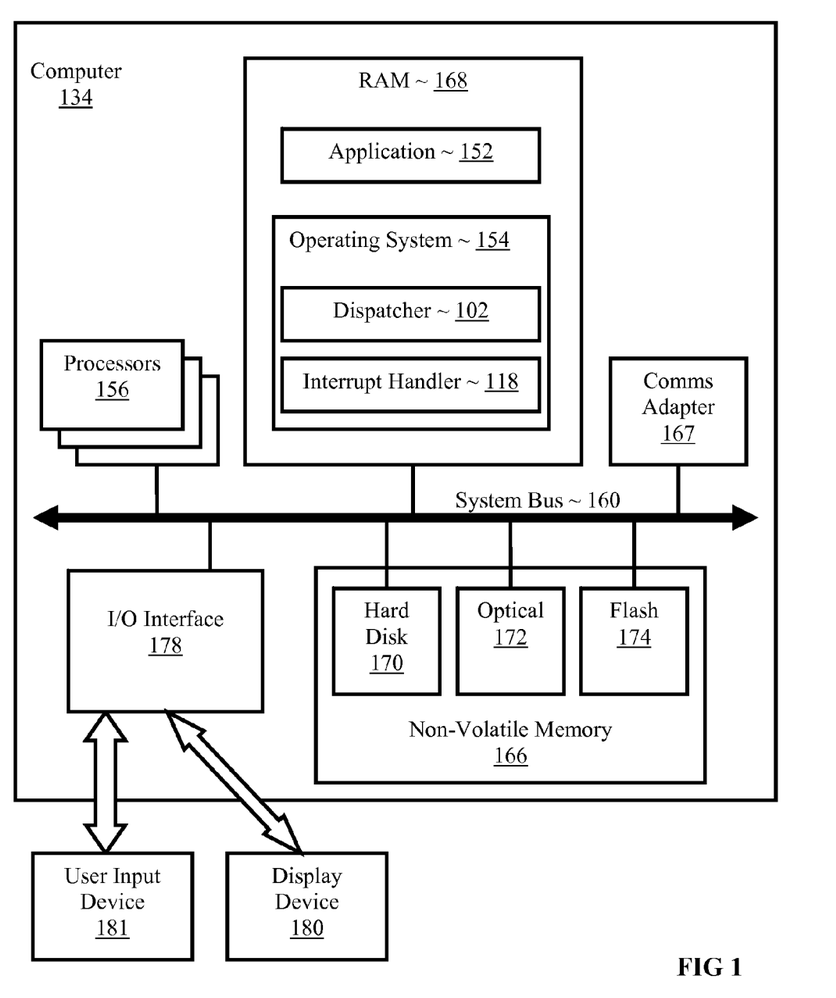
FIG. 1 sets forth a block diagram of an exemplary computer system operable according to various embodiments of the present invention for scheduling threads in a multi-processor computer system.

Exemplary methods, systems, and computer program products for scheduling threads in a multi-processor computer system according to embodiments of the present invention are described with reference to the accompanying drawings, beginning with FIG. 1. FIG. 1 sets forth a block diagram of an exemplary computer system (134) operable according to various embodiments of the present invention for scheduling threads in a multi-processor computer system by establishing for a thread having thread affinity for one or more processors an interrupt threshold representing a maximum permissible number of interrupts during thread execution on a processor, executing the thread on a current processor, counting interrupts during execution of the thread on the current processor, and removing thread affinity for the current processor in dependence upon the counted number of interrupts and the interrupt threshold.

The computer (134) of FIG. 1 shows three computer processors (156). The number three is not a limitation of the invention, however, as computer systems according to embodiments of the present invention may include any number of processors. Moreover, the type of processor also is not a limitation of the present invention. Some processors may support execution of only one thread at a time. Other processors may support hardware multi-threading or 'simultaneous multi-threading' ('SMT'), hardware support for multiple independent threads on a processor at the same time, multiple registers sets for threads instead of just one, allowing multiple threads to issue multiple instructions during each cycle of a processor's execution. Threads running on SMT processors experience interrupts just as do threads on single-threaded processors, and methods according to the present invention are equally useful on both.

The computer of FIG. 1 also includes random access memory (168) ("RAM"). Stored in RAM (168) is an application program (152). Application programs useful in systems according to the present invention includes, word processors, spreadsheets, database management systems, email clients, web servers, and any other application as will occur to those of skill in the art. Application programs according to embodiments of the present invention may be programmed to establish interrupt thresholds for threads and to establish maximum count durations for threads as, for example, a parameter in a createThread ( ) call, or as a configuration parameter for all or part of a computer system, or as an API call which may be issued at any time from the application or from a thread in the application as, for example, setInterruptThreshold(Integer myInterruptThreshold).

Also stored in RAM (168) is an operating system (154), which in turn includes a dispatcher (102) and an interrupt handler (118). Operating systems useful in computers according to embodiments of the present invention include Unix™, Linux™, Microsoft NT™, and many others as will occur to those of skill in the art. Interrupt handler (118) is a software function in the operating system programmed according to embodiments of the present invention, in addition to its usual duties, also to count interrupts occurring during execution of a thread on a processor. Dispatcher (102) is a software function in the operating system programmed according to embodiments of the present invention, in addition to its usual duties of administering the status of threads in the system, also to remove thread affinity for a current processor to which a thread is current assigned ('a current processor') in dependence upon the counted number of interrupts and the interrupt threshold—if, for example, the counted number of interrupts exceeds the interrupt threshold.

The computer of FIG. 1 includes non-volatile computer memory (166) coupled through a system bus (160) to processors (156) and to other components of the computer. Non-volatile memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art.

The example computer (134) of FIG. 1 includes a communications adapter (167) implementing connections for data communications with other computers, clients, servers, or networks. Communications adapters implement the hardware level of connections for data communications between computers directly with one another and through networks. Examples of communications adapters include modems for wired dial-up connections, Ethernet (IEEE 802.3) adapters for wired LAN connections, and 802.11b adapters for wireless LAN connections.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181), such as keyboards and mice.

Figure 2:
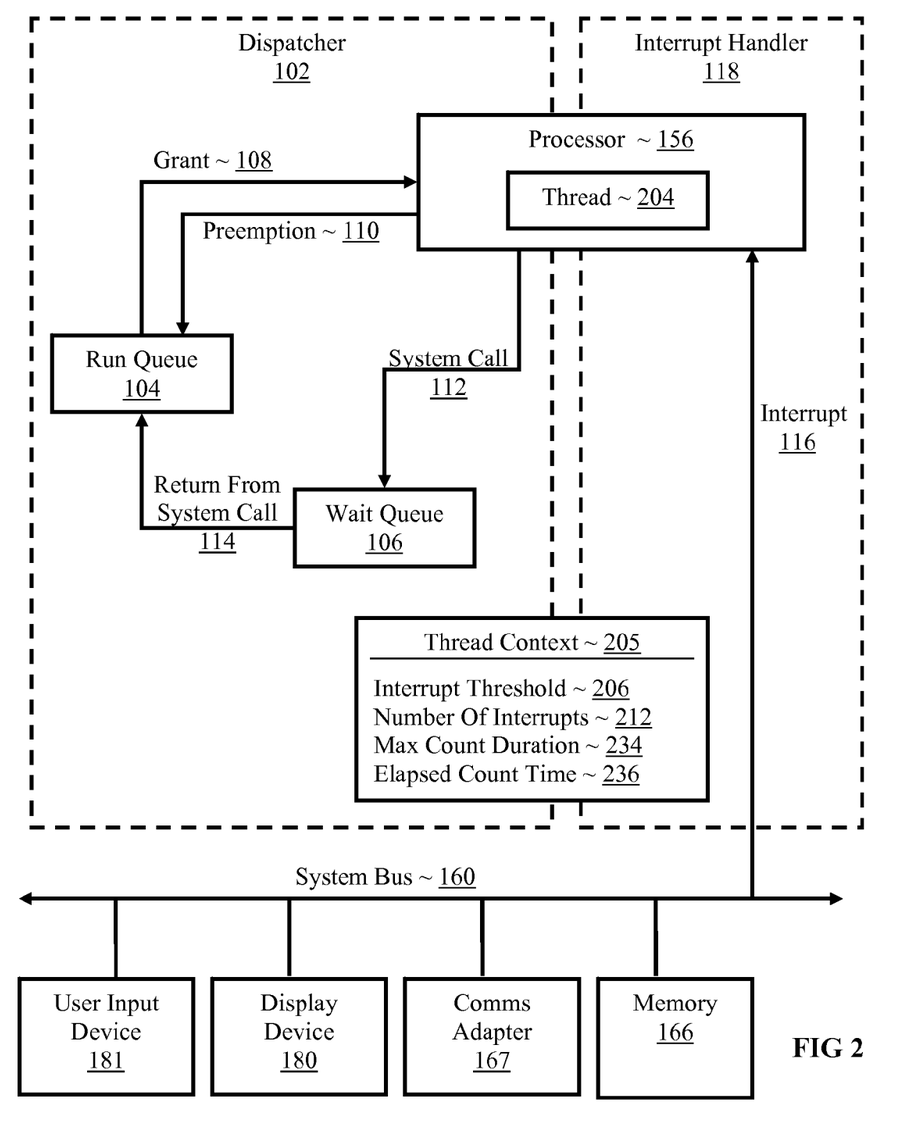
FIG. 2 sets forth a block diagram of an exemplary operating system operable according to one or more embodiments of the present invention.

For further explanation, FIG. 2 sets forth a block diagram of an exemplary operating system operable according to one or more embodiments of the present invention. In the exemplary system of FIG. 2, thread (204) has been granted (108) the processor (156). That is, thread (204) has been 'dispatched' to processor (156) and is currently running on processor (156). Thread (204) is authorized to occupy the processor for no more than a maximum amount of time referred to as a 'time slice,' after which the thread is said to be 'preempted' for return to the run queue until other threads with the same priority rating have a chance to run on the processor. The system of FIG. 2 includes a run queue (104) that contains all the threads of the system that are in the 'ready' state, waiting in priority order for dispatching to a processor. Threads are placed in the run queue (104) when they are first created and from the wait queue (106) upon returns from system calls (114). Threads also are placed on the run queue (104) when they are preempted (110) while running on a processor; that is, when a higher priority thread arrives in the run queue (104) or when a thread's time slice expires.

The system of FIG. 2 includes also a wait queue (106) that includes the threads of the systems that are in the 'wait' state, waiting for input/output returns from peripheral devices such as user input devices (181), display devices (180), communications adapters (167), memory (166), and others as will occur to those of skill in the art. Threads running on a processor are moved to the wait queue (106) and to the 'wait' state when they issue system calls (112). Such system calls are often requests for data input from or output to peripheral devices (181, 180, 167, 166).

A thread (204) running on a processor (156) may be interrupted (116). An interrupt is a mechanism by which a computer subsystem or module external to a processor may interrupt the otherwise normal flow of operations on the processor. In particular, in interrupt-drive input/output processing, interrupts are provided so that a thread sending or receiving data to or from a peripheral device need not block and wait. Instead, the thread issues a system call (112) and suspends operation while waiting on the wait queue (106) for its data. When the peripheral device has the data ready, the peripheral device triggers an interrupt (116) by signaling the processor (156), usually by way of a system bus (160). The processor 'catches' the interrupt, saves the thread's operating context, and then hands control over to an interrupt handler (118) that 'clears' the interrupt by processing it. The thread's saved operating context is at least all information needed to resume thread processing at the point at which it was interrupted, that is, at least the processor status registers and the location of the next instruction to be executed in the interrupted thread, in addition to whatever other information is needed by the particular operating system. The thread's operating context (205) in the example of FIG. 2 is saved on fast local memory directly available to the interrupt handler (118) and the dispatcher modules (102) with no need to access main memory. Such fast local memory directly available to the interrupt handler and the dispatcher modules may be implemented as, for example, a system control stack, kernel stack, or a scratch pad memory. In particular, in the example system of FIG. 2, the thread context (205) saved according to embodiments of the present invention includes an interrupt threshold (206) for the thread, the number of interrupts (212) experienced by the thread (204) so far in its operations on the processor (156), a maximum count duration (234), and an elapsed count time (236).

The maximum count duration (234) and the elapsed count time (236) in this example work together to prevent the interrupt count from extending without limit. The maximum count duration (234) is the maximum period for maintaining a count of interrupts. The elapsed count time (236) is the period through which interrupts have presently been counted. In this example, when the elapsed time count (236) exceeds the maximum count duration (234), the elapsed count time (236) and the interrupt count (212) are reset to zero.

It is useful for explanation to note that there is no required relationship between the size of a processing time slice for a thread and the thread's maximum count duration (234). A thread's maximum count duration (234) may be less than, equal to, or greater than the thread's time slice. A thread may be assigned a time slice of, for example, 20 milliseconds while its maximum count duration is set to 100 milliseconds. In such an example, interrupts of the thread are counted across at least five of the thread's time slices, and interrupts of the thread may be counted across more than five of the thread's time slices because the thread may not always time out on its time slice. Instead, the thread may be preempted by a higher-priority thread or may issue system calls, thereby losing a portion of a particular time slice. The example thread having a time slice of 20 milliseconds and a maximum count duration of 100 milliseconds therefore may run on the processor more than five times before its elapsed count time becomes equal to or greater than its maximum count duration.

Figure 3:
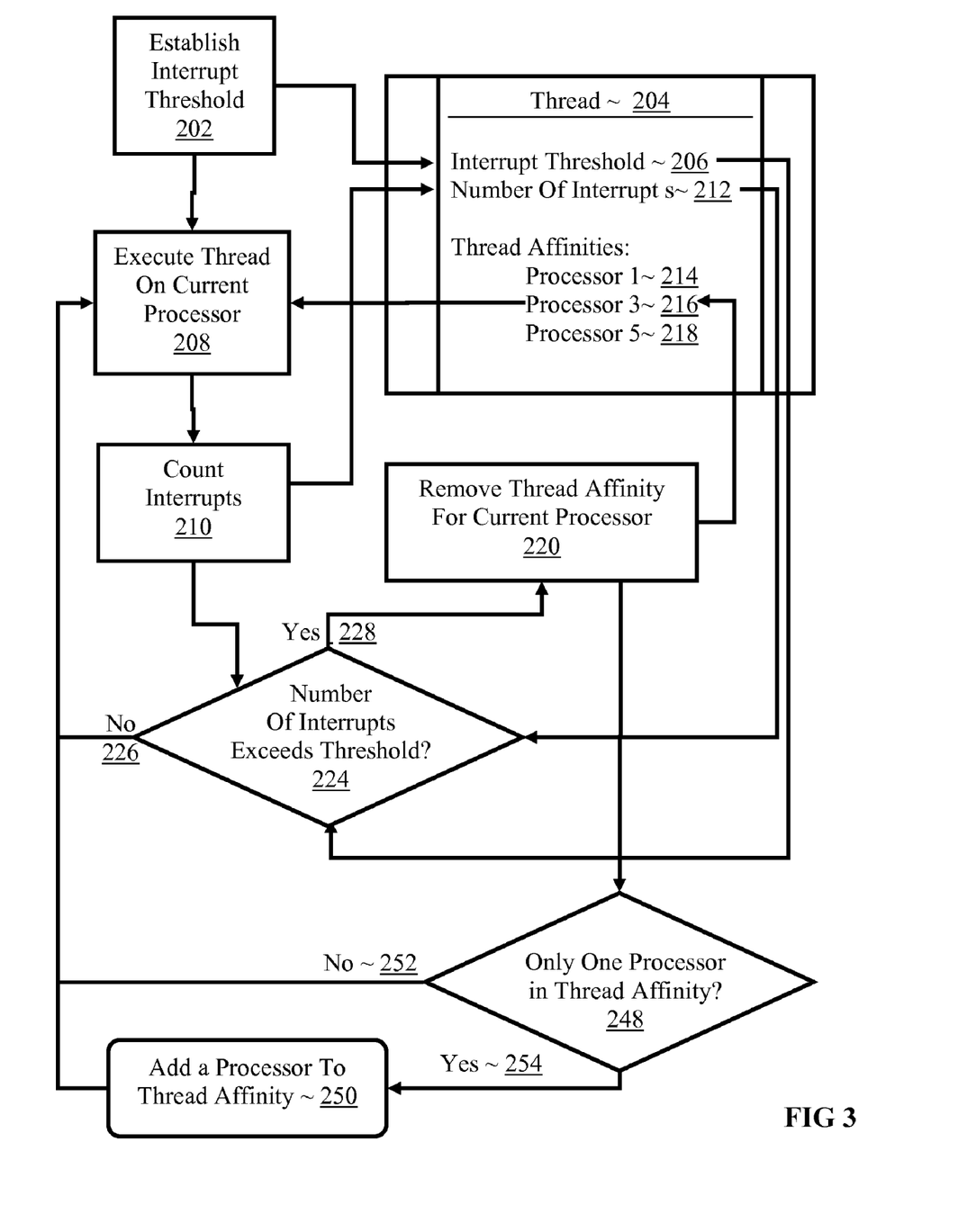
FIG. 3 sets forth a flow chart illustrating an exemplary method for scheduling threads in a multi-processor computer system.

For further explanation, FIG. 3 sets forth a flow chart illustrating an exemplary method for scheduling threads in a multi-processor computer system that includes establishing (202) an interrupt threshold (206) for a thread (204). In the method of FIG. 3, the interrupt threshold represents a maximum number of interrupts permitted during thread execution on a processor. The interrupt threshold may be established by use of a parameter in a system call that creates a thread, as in, for example, createThread(..., Integer MaxInterrupts). Alternatively, an interrupt threshold may be set as a configuration parameter applicable to all threads in an operating system. Or an interrupt threshold may be set through a system call that may be issued at any time from an application or even from the thread itself as in, for example, setInterruptThreshold (Integer ThreadID, Integer MaxInterrupts). In the method of FIG. 3, establishing (202) an interrupt threshold may be carried out by storing a value of an interrupt threshold in memory associated with the thread. An interrupt threshold may be stored in a thread context (205 on FIG. 2) in registers on a processor, in a system stack, a kernel stack, scratchpad memory for the thread, or in a higher-level construct in the operating system such as a thread control block or a thread table.

The method of FIG. 3 includes executing (208) the thread on a current processor, the thread having thread affinity for one or more processors including the current processor. Executing the thread on a current processor is carried out typically by a dispatcher's granting the processor to the thread for thread execution. That is, the thread is dispatched from a run queue to the processor according to the thread's priority. The thread is dispatched to run on the processor for a length of time not exceeding a 'time slice.' Thread (204) in the example of FIG. 3 is shown with thread affinity for three processors, processor 1 (214), processor 3 (216), and processor 5 (218), where processor 3 (216) is taken as the current processor. That is, thread (204) is authorized to run on processor 1, processor 3, or processor 5, and thread (204) is assigned to actually run on processor 3.

The method of FIG. 3 includes counting (210) a number of interrupts during execution of the thread on the current processor. In the method of FIG. 3, counting (210) a number of interrupts may include incrementing by an interrupt handler a value stored in memory associated with the thread. In fact, counting (210) the number of interrupts during execution of the thread on the current processor is typically carried out by an interrupt handler. The interrupt handler is configured with an interrupted thread's context location, including the storage location of the thread's interrupt count, in fast local memory such as a system stack or scratchpad. At some point in processing between the time when the interrupt handler is first called and the time when the interrupt handler calls a 'return from interrupt' routine to return the processor to the interrupted thread, the interrupt handler increments the interrupt count for the thread.

The method of FIG. 3 also includes removing (220) thread affinity for the current processor in dependence upon the counted number of interrupts (212) and the interrupt threshold (206). As mentioned earlier, in the method of FIG. 3, removing (220) thread affinity for the current processor is typically carried out by removing thread affinity by a dispatcher when the thread is preempted from execution on the current processor—either because the thread used its entire time slice on the processor or by the arrival in the run queue of a another thread having higher priority. Removing (220) thread affinity for the current processor in dependence upon the counted number of interrupts (212) and the interrupt threshold (206) in the example of FIG. 3 is carried out when the number of interrupts (212) as counted exceeds (228) the interrupt threshold (206) for the thread. That is, in the example of FIG. 3, a dispatcher during preemption processing compares (224) the number of interrupts (212) as counted for the thread and the interrupt threshold (206) to determine whether the number of interrupts exceeds the interrupt threshold. If the number of interrupts exceeds (228) the interrupt threshold, the dispatcher removes (220) thread affinity for the current processor. If the number of interrupts does not exceed (226) the interrupt threshold, the dispatcher continues (226) thread execution (208) on the current processor.

Removing (220) thread affinity for the current processor in the example of FIG. 3 where thread (204) has thread affinity for three processors:
  processor 1 (214)
  processor 3 (216)
  processor 5 (218),
results in the following new thread affinity for only two processors:
  processor 1 (214)
  processor 5 (218).

In this example, where the current processor was previously processor 3 (216), the dispatcher will next assign either processor 1 or processor 5 as the current processor for actual thread execution.

Removing (220) thread affinity for the current processor may be implemented, for example, by use of a system call such Windows NT's "setThreadAffinityMask()." Calls to setThreadAffinityMask ( ) may have the following form, for example:
  DWORD_PTR  SetThreadAffinityMask(HANDLE Thread, DWORD_PTR ThreadAffinityMask);

where the double word 'ThreadAffinityMask' is a bit vector in which each bit represents the processor on which a thread is authorized to run. A call to setThreadAffinityMask() for the purpose of removing (220) thread affinity for a current processor sets a thread affinity mask for the thread that excludes the current processor. In a system having 16 processors numbered 0-15, for example, where a thread running on processor 1 has thread affinity for processors 0, 1, 8, and 12 a bit vector thread affinity mask may be expressed in as binary 0001 0001 0000 0011, hex 1103, or decimal 5355. In such an example, removing (220) thread affinity for a current processor may be carried out by setting any supported thread affinity mask that excludes the current processor, such as, for example, the mask expressed in binary as 0001 0001 0000 0001, which sets thread affinity to processors 0, 8, and 12 only, thereby excluding the current processor number 1. In this example, the next time a dispatcher assigns the subject thread to a processor, processor 1 will not be among the processors for which the thread has affinity, and the thread will be assigned to run on one of the other processors for which it has affinity. In some methods for scheduling threads in a multi-processor computer system according to embodiments of the present invention, removing (220) thread affinity for the current processor may be carried out by placing the thread in a run queue of another processor. In some systems according to embodiments of the present invention, threads are dispatched to multiple processors from a single common run queue. In other systems, each processor has its own run queue. Systems having separate run queues for each processor may or may not support thread affinity masks. In systems where each processor has its own run queue, a dispatcher may remove (220) thread affinity for the current processor, whenever the thread is preempted, by placing the thread in a run queue of another processor.

In the method of FIG. 3, thread affinity may include only the current processor (254), and in such an example, the method also advantageously includes setting thread affinity (250) to include at least one other processor. This aspect of the method of FIG. 3 addresses examples in which a system supports thread affinity masking, but the present thread affinity mask for a process includes only one processor. If that processor is removed from the mask, another needs to be added for the thread to run. Such systems may enforce default assignments of thread affinity. The method of FIG. 3, however, advantageously includes setting thread affinity in this circumstance to at least one processor other than the current one just removed from affinity. In the method of FIG. 3, when removing a thread affinity for a current processor (220), if the thread has affinity with more than one processor (252), then there is no need to add (250) a processor to the thread affinity; the dispatcher will dispatch the thread to a new current processor where the thread will continue execution (208).

Figure 4:
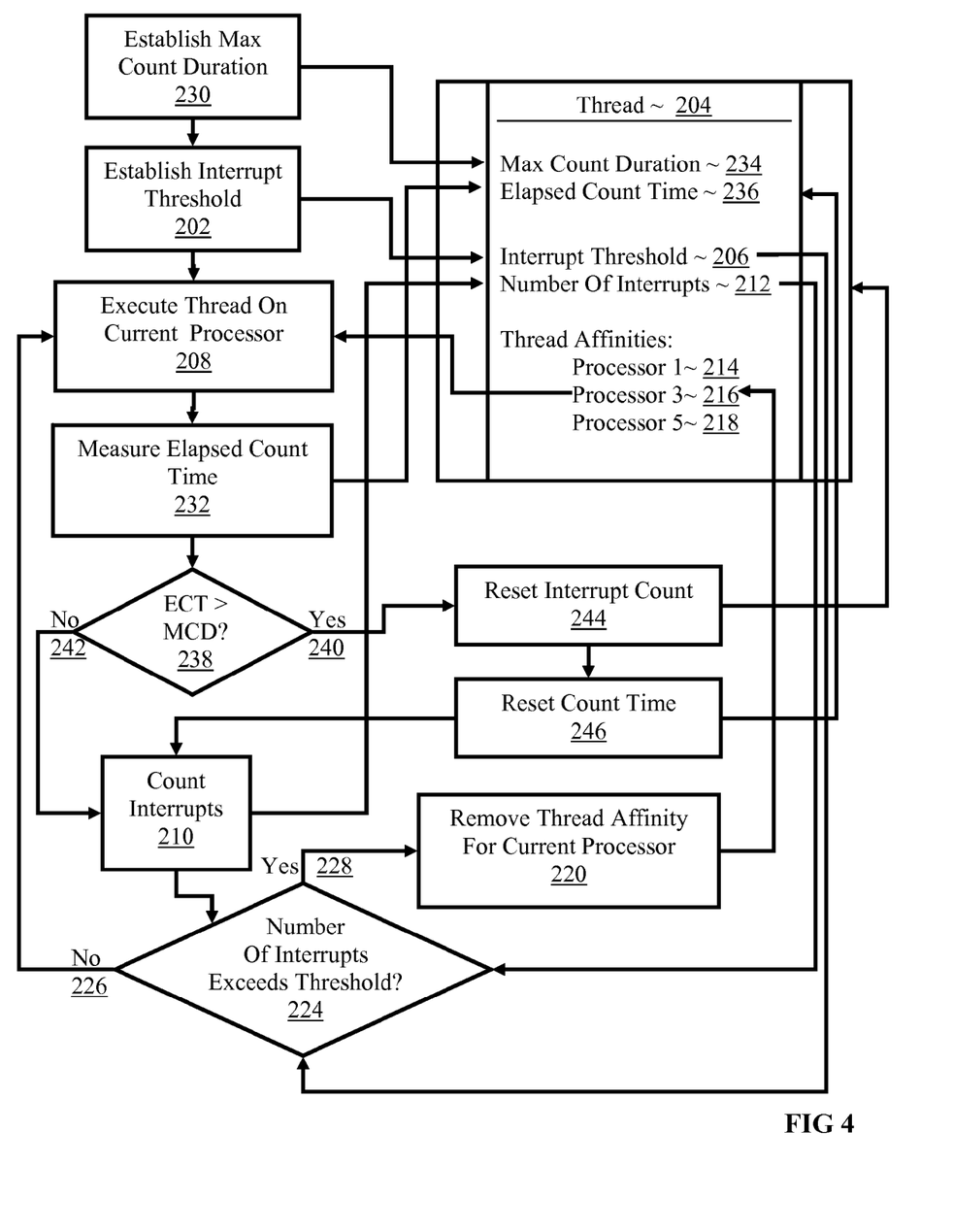
FIG. 4 sets forth a flow chart illustrating an exemplary method for scheduling threads in a multi-processor computer system that includes operations with a maximum count duration and an elapsed count time.

For further explanation, FIG. 4 sets forth a flow chart illustrating an exemplary method for scheduling threads in a multi-processor computer system that includes operations with a maximum count duration and an elapsed count time. The method of FIG. 4 is an extension of the method of FIG. 3. That is, the method of FIG. 4 includes establishing (202) an interrupt threshold, counting interrupts (210), and removing (220) thread affinity for the current processor in dependence upon the counted number of interrupts (212) and the interrupt threshold (206), all as described above for the method of FIG. 3. In addition, the method of FIG. 4 also includes establishing (230) a maximum count duration (234) for the thread (204). A maximum count duration (234) for the thread (204) may be implemented, for example, as an integer stored in association with the thread context in a system stack, a scratchpad, a thread control block, a thread table, and so on, to represent the period of time during which interrupts are to be counted for a thread. Establishing (230) a maximum count duration (234) for the thread (204) then may be implemented through a system call provided for that purpose such as, for example:
  INTEGER  SetMaxCountDuration(HANDLE Thread, INTEGER MaxCountDuration).

The method of FIG. 4 also includes measuring (232) elapsed count time (236) for the thread during execution of the thread on the current processor. Operating systems typically include a function that runs periodically, for example, once per second, to age threads. Such a function may be modified according to embodiments of the present invention to increment elapsed count time also for a thread. Maximum count duration may be less than, equal to, or greater than a thread's assigned time slice for actual possession of a processor. Elapsed count time therefore may persist across time slices, that is, across multiple run states for a thread, across multiple trips from the run queue to a processor and back, across multiple preemptions. Alternatively, if maximum count duration for a thread is set to a period that is less than the thread's assigned time slice, elapsed count time may always be less than the actual duration of a thread's possession of a processor.

The method of FIG. 4 also includes resetting (244, 246) both the counted number of interrupts (212) and the measured elapsed count time (236) to zero in dependence upon the measured elapsed count time (236) and the maximum count duration (234). More particularly, both the counted number of interrupts (212) and the measured elapsed count time (236) are reset (244, 246) to zero in the example of FIG. 4 when the elapsed count time (236) exceeds (240) the maximum count duration (234) for the thread (204). In the example of FIG. 4, an interrupt handler compares (238) the elapsed count time (236) and the maximum count duration (234) for the thread (204). If the elapsed count time (236) does not exceed (242) the maximum count duration (234) for the thread (204), interrupt counting (210) proceeds without resetting (244, 246) the counted number of interrupts (212) and the measured elapsed count time (236). If the elapsed count time (236) does exceed (240) the maximum count duration (234) for the thread (204), interrupt counting (210) proceeds only after resetting (244, 246) both the counted number of interrupts (212) and the measured elapsed count time (236) to zero.

Figure 5:
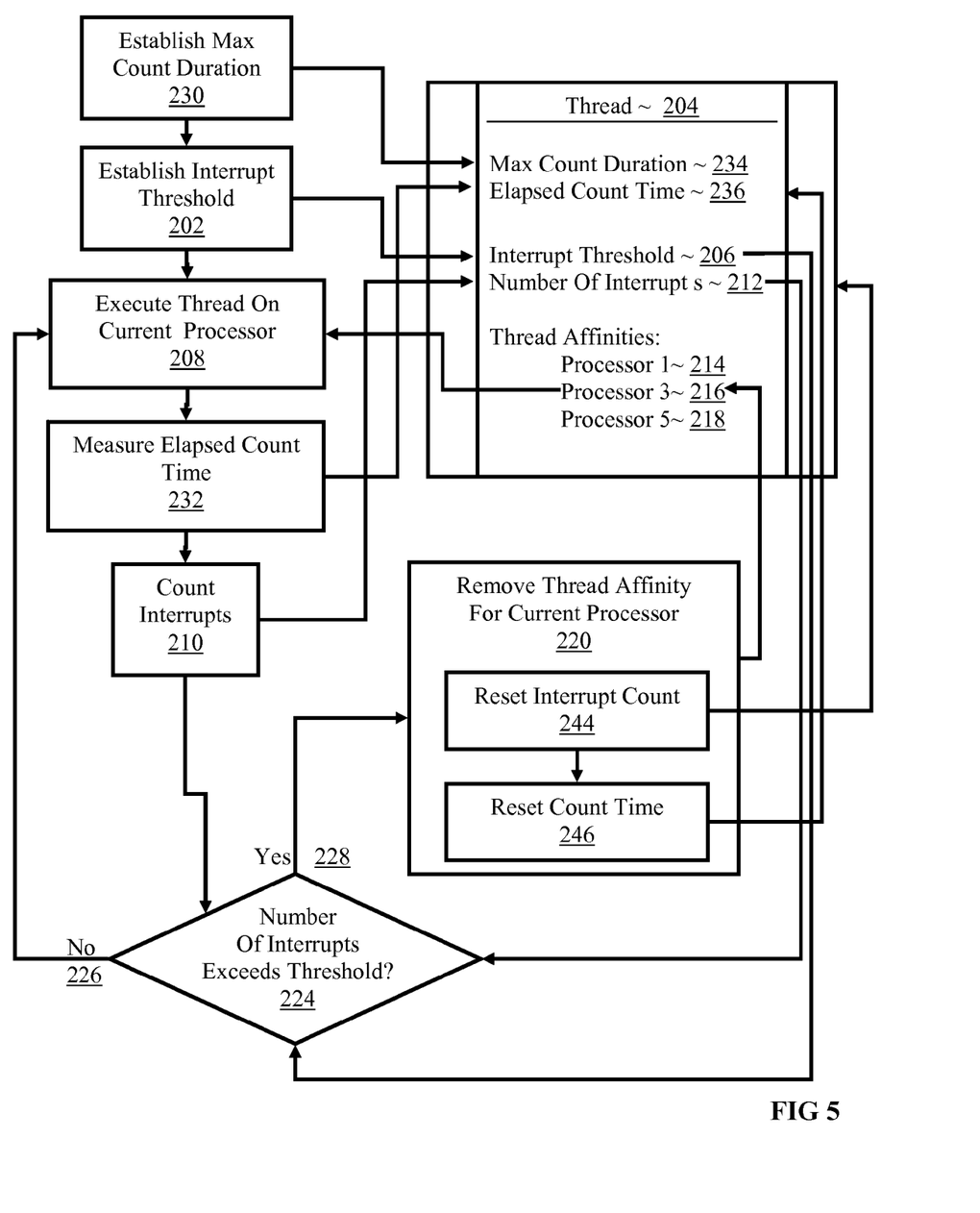
FIG. 5 sets forth a flow chart illustrating an exemplary method for scheduling threads in a multi-processor computer system that includes operations with a maximum count duration and an elapsed count time in removing thread affinity according to a counted number of interrupts and an interrupt threshold.

For further explanation, FIG. 5 sets forth a flow chart illustrating an exemplary method for scheduling threads in a multi-processor computer system that includes operations with a maximum count duration and an elapsed count time in removing thread affinity according to a counted number of interrupts and an interrupt threshold. The method of FIG. 5 is an extension of the method of FIG. 3. That is, the method of FIG. 5 includes establishing (202) an interrupt threshold, counting interrupts (210), and removing (220) thread affinity for the current processor in dependence upon the counted number of interrupts (212) and the interrupt threshold (206), all as described above for the method of FIG. 3. In addition, The method of FIG. 5 also includes establishing (230) a maximum count duration (234) for the thread (204) and measuring (232) elapsed count time (236) for the thread during execution of the thread on the current processor as described above for the method of FIG. 4. In the method of FIG. 5, however, because the thread will now be dispatched for its next time slice to a different processor, removing thread affinity (220) for the current processor in dependence upon the counted number of interrupts (212) and the interrupt threshold (206) advantageously includes resetting (244) the counted number of interrupts (212) to zero and resetting (246) the measured elapsed count time (236) to zero.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for scheduling threads in a computer having one or more processors, the method comprising:
    establishing an interrupt threshold for a thread, the interrupt threshold comprising a maximum permissible number of interrupts during execution of the thread on a processor of the one or more processors;
    executing the thread on a current processor, the thread having thread affinity for at least one processor of the one or more processors, the at least one processor including the current processor;
    counting a number of interrupts during execution of the thread on the current processor;
    establishing a maximum count duration for the thread;
    measuring elapsed count time for the thread during execution of the thread on the current processor; and
    removing, by a dispatcher, the thread affinity for the current processor in dependence upon the counted number of interrupts and the interrupt threshold,
    wherein removing the thread affinity for the current processor prevents execution of the thread on the current processor and further comprises:
    resetting the counted number of interrupts to zero; and
    resetting the measured elapsed count time to zero.

2. The method of claim 1 wherein establishing an interrupt threshold further comprises storing a value of the interrupt threshold in memory associated with the thread.

3. The method of claim 1 wherein counting a number of interrupts further comprises incrementing by an interrupt handler a value stored in memory associated with the thread.

4. The method of claim 1 wherein removing the thread affinity for the current processor further comprises placing the thread in a run queue of another processor.

5. The method of claim 1 wherein the thread affinity includes only the current processor, and the method further comprises setting the thread affinity to include at least one other processor.

6. The method of claim 1 further comprising:
    resetting the counted number of interrupts to zero in dependence upon the measured elapsed count time and the maximum count duration; and
    resetting the measured elapsed count time to zero in dependence upon the measured elapsed count time and the maximum count duration.

7. The method of claim 1, wherein the thread affinity for the current processor is removed on the condition that the counted number of interrupts equals the interrupt threshold and the maximum count duration exceeds the measured elapsed count time.

8. The method of claim 1, wherein the thread affinity for the current processor is maintained on the condition that the interrupt threshold exceeds the counted number of interrupts and the measured elapsed count time equals the maximum count duration.

9. A system for thread execution, the system comprising:
    one or more processors;
    a memory accessible by the one or more processors; and
    a set of instructions stored in the memory, wherein any combination of the one or more processors executes the set of instructions in order to perform actions of:
    establishing an interrupt threshold for a thread, the interrupt threshold comprising a maximum permissible number of interrupts during execution of the thread on a processor of the one or more processors;

executing the thread on a current processor, the thread having thread affinity for at least processor one of the one or more processors, the least one processor including the current processor;

counting a number of interrupts during execution of the thread on the current processor;

establishing a maximum count duration for the thread;

measuring elapsed count time for the thread during execution of the thread on the current processor; and removing, by a dispatcher, the thread affinity for the current processor in dependence upon the counted number of interrupts and the interrupt threshold, wherein the removing the thread affinity for the current processor prevents execution of the thread on the current processor and further comprises:

resetting the counted number of interrupts to zero; and resetting the measured elapsed count time to zero.

10. The system of claim 9 wherein the establishing an interrupt threshold further comprises storing a value of the interrupt threshold in a portion of the memory associated with the thread.

11. The system of claim 9 wherein the counting a number of interrupts further comprises incrementing by an interrupt handler a value stored in a portion of the memory associated with the thread.

12. The system of claim 9 wherein the removing the thread affinity for the current processor further comprises placing the thread in a run queue of another processor.

13. The system of claim 9 wherein the thread affinity includes only the current processor, and the set of instructions further comprises setting the thread affinity to include at least one other processor of the one or more processors.

14. The system of claim 9 wherein the set of instructions further comprises:

resetting the counted number of interrupts to zero in dependence upon the measured elapsed count time and the maximum count duration; and resetting the measured elapsed count time to zero in dependence upon the measured elapsed count time and the maximum count duration.

15. The system of claim 9, wherein the thread affinity for the current processor is removed on the condition that the counted number of interrupts equals the interrupt threshold and the maximum count duration exceeds the measured elapsed count time.

16. The system of claim 9, wherein the thread affinity for the current processor is maintained on the condition that the interrupt threshold exceeds the counted number of interrupts and the measured elapsed count time equals the maximum count duration.

17. A computer program product for scheduling threads in a computer having one or more processors, the computer program product comprising a recording medium storing instructions for:

establishing an interrupt threshold for a thread, the interrupt threshold comprising a maximum permissible number of interrupts during execution of the thread on a processor of the one or more processors;

executing the thread on a current processor, the thread having thread affinity for at least one of the one or more processors, the at least one processor including the current processor;

counting a number of interrupts during execution of the thread on the current processor;

establishing a maximum count duration for the thread;

measuring elapsed count time for the thread during execution of the thread on the current processor; and removing, by a dispatcher, the thread affinity for the current processor in dependence upon the counted number of interrupts and the interrupt threshold, wherein removing the thread affinity for the current processor prevents execution of the thread on the current processor and further comprises:

resetting the counted number of interrupts to zero; and resetting the measured elapsed count time to zero.

18. The computer program product of claim 17, the instructions for establishing an interrupt threshold further comprising instructions for storing a value of the interrupt threshold in memory associated with the thread.

19. The computer program product of claim 17 the instructions for counting a number of interrupts further comprising instructions for incrementing by an interrupt handler a value stored in memory associated with the thread.

20. The computer program product of claim 17 the instructions for removing the thread affinity for the current processor further comprising instructions for placing the thread in a run queue of another processor.

21. The computer program product of claim 17 wherein the thread affinity includes only the current processor, and the recording medium further comprises, instructions for setting the thread affinity to include at least one other processor.

22. The computer program product of claim 17, the recording medium further storing instructions for:

resetting the counted number of interrupts to zero in dependence upon the measured elapsed count time and the maximum count duration; and resetting the measured elapsed count time to zero in dependence upon the measured elapsed count time and the maximum count duration.

23. The computer program product of claim 17, the recording medium further storing instructions for:

removing the thread affinity for the current processor on the condition that the counted number of interrupts equals the interrupt threshold and the maximum count duration exceeds the measured elapsed count time.

24. The computer program product of claim 17, the recording medium further storing instructions for maintaining the thread affinity for the current processor on the condition that the interrupt threshold exceeds the counted number of interrupts and the measured elapsed count time equals the maximum count duration.

* * * * *